(12) United States Patent
Mitsuda et al.

(10) Patent No.: US 6,878,354 B1
(45) Date of Patent: Apr. 12, 2005

(54) CATALYST AND PROCESS FOR EXHAUST PURIFICATION

(75) Inventors: Kenro Mitsuda, Tokyo (JP); Minoru Satou, Tokyo (JP); Hiroaki Sigeoka, Tokyo (JP); Ryoji Nishiyama, Tokyo (JP); Yuji Kishimoto, Tokyo (JP); Hideaki Katashiba, Tokyo (JP); Hirofumi Oouchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 720 days.

(21) Appl. No.: 09/644,687

(22) Filed: Aug. 24, 2000

(30) Foreign Application Priority Data

Sep. 3, 1999 (JP) ........................................... 11-249662
Sep. 3, 1999 (JP) ........................................... 11-249663

(51) Int. Cl.[7] .......................... B01D 53/34; B01J 23/00; F01N 3/00
(52) U.S. Cl. ........................ 422/211; 422/168; 422/177; 422/180; 422/211; 423/210; 423/212; 423/213.2; 502/325; 502/326; 502/334; 60/272; 60/282; 60/299
(58) Field of Search ................................. 422/168, 169, 422/170, 171, 174, 177, 180, 211, 222; 423/212–213.7; 502/325, 326, 334; 60/272, 274, 282, 299, 301, 302, 304

(56) References Cited

U.S. PATENT DOCUMENTS

5,473,887 A    12/1995  Takeshima et al. ........... 60/276
5,884,473 A  *  3/1999  Noda et al. ................... 60/274

FOREIGN PATENT DOCUMENTS

JP          10-270055      10/1998

* cited by examiner

*Primary Examiner*—Alexa Doroshenk
(74) *Attorney, Agent, or Firm*—Leydig, Voit & Mayer, Ltd.

(57) ABSTRACT

A catalyst for internal combustion engine exhaust purification without frequently switching to a rich burn mode. The catalyst includes a catalyst A containing an $NO_x$ absorbing substance and an $NO_x$ reducing catalyst, a catalyst B containing a hydrogen adsorption substance and a hydrogen oxidizing catalyst, an electron conductive substance C, and an ion conductive substance D. Electrons move between the catalyst A and the catalyst B through the electron conductive substance C, ions move through the ion conductive substance D, and an electrochemical reducing reaction and an electrochemical oxidizing reaction respectively occur on the catalyst A and on the catalyst B. Therefore, it is possible to quickly reduce the adsorbed $NO_x$ using the adsorbed hydrogen without depending on the atmosphere.

6 Claims, 10 Drawing Sheets

CATALYST AND PROCESS FOR EXHAUST PURIFICATION

BACKGROUND OF THE INVENTION

The present invention relates to a catalyst for exhaust purification, which can purify exhaust from a combustion engine such as a vehicle or a diesel car. And particularly it relates to an electrochemical catalyst for exhaust purification, which can store both $NO_x$ and hydrocarbons and electrochemically react $NO_x$, with hydrocarbons.

A conventional catalyst for exhaust purification, as typically a ternary catalyst, has played an important role in reducing an exhausted quantity of $NO_x$, CO and HC by carrying out a reduction reaction reducing nitrogen oxides such as NO and $N0_2$ to nitrogen and an oxidation reaction oxidizing reductive substances such as hydrocarbons (HC) and CO on the same catalyst. However, methods for burning fuel under a lean condition such as a lean-burn engine and GDI (gas direct injection) engine are used in order to improve efficiency of a combustion engine, making it difficult to constantly supply HC and CO in an amount for sufficiently reducing $NO_x$.

For this reason, there is used a method, in which $NO_x$ is temporarily stored by using an $NO_x$ absorbing substance, such as barium carbonate ($BaCO_3$) and, a rich driving mode is occasionally carried out in every one or two minutes supplying HC and CO to reduce the stored $NO_x$. However, since the $NO_x$ absorbing substance deteriorates due to sulfur poisoning and $NO_x$ absorbing capability is changed, it is difficult to predetermine timing for providing the rich driving mode and timing for a reactivation process for the sulfur poisoning. And it is necessary to drive while always monitoring using an air-ratio sensor, an oxygen sensor or the like. Moreover, there arises a problem such as torque shock upon inserting a rich spike, depending on driving modes.

HC, in addition to $NO_x$, can be temporarily stored by using an HC adsorption substance together with an $NO_x$ absorption substance. For example, Japanese Unexamined Patent Publication NO. 10-225636/1998 discloses a method for placing an HC adsorption substance around the $NO_x$ absorbing substance. FIG. 11 is an explanatory drawing of a catalyst for exhaust purification disclosed in the abovementioned publication. In the FIG., 30 represents a particle of platinum catalyst, 31 represents a particle of rhodium catalyst, 32 represents a first powder (mordenite type zeolite) functioning as a support, 33 represents second powder (Ba/alumina) containing Ba as an $NO_x$ absorption substance, and 34 represents zirconia as an adsorption substance for HC. In a rich atmosphere, HC is adsorbed by zirconia 34, and hydrogen is generated on the Rh catalyst particle 31 by a reaction of HC and water vapor, and the hydrogen reduces $NO_x$. Moreover, in a lean atmosphere, $NO_x$ is absorbed by barium carbonate contained in the second powder 33. When, the atmosphere is temporarily changed to a stoichiometric ratio (stoichiometric air-fuel ratio) or a rich atmosphere, $NO_x$ absorbed by the second powder 33 as the $NO_x$ absorption substance is released, so that $NO_x$ is reduced to $N_2$ by reacting with HC and CO in exhaust according to the catalytic function of Pt 30 and Rh 31. Therefore, zirconia 34 as an HC adsorption substance is used to generate hydrogen by reaction with water vapor, and its purpose is to generate hydrogen as a reduction substance having high reactivity. Namely, even if zirconia 34 as an HC adsorption substance is placed around the second powder 33 as an $NO_x$ absorption substance, it is impossible to directly react $NO_x$ absorbed in the second powder 33 as an $NO_x$ absorbing substance with HC adsorbed in zirconia 34. This is because the reduction substance and the oxidation substance can not be reacted with each other, unless they are on the same catalyst particle, whether it is Pt or Rh. Namely, unless the oxidation substance and the reduction substance are placed together in a gaseous phase, it is impossible to reduce the oxidation substance (converting $NO_x$ to nitrogen) and to oxidize the reduction substance (converting HC to carbon dioxide and water). This fact has been commonly recognized in a long history of the conventional catalyst for exhaust, and it is inevitable to carry out both oxidation and reduction through chemical reactions on a catalyst. Therefore, even if zirconia 34 as an adsorption substance for HC is placed around the second powder 33 serving as an $NO_x$ absorbing substance, it is impossible to reduce $NO_x$ unless a rich spike process is carried out.

With respect to effects obtained when an adsorption substance for HC is placed around an $NO_x$ absorbing substance, Japanese Unexamined Patent Publication NO. 10-57763/1998 describes that the installation of the HC adsorption substance increases the conversion to $N_2$, although not less than half of $NO_x$ is not converted to $N_2$, but to $N_2O$ by using only the $NO_x$ absorbing substance.

Besides these, as a mixed catalyst for exhaust purification, there is a catalyst obtained by merely mixing an oxidizing catalyst and a reducing catalyst, which is disclosed in Japanese Unexamined Patent Publication NO. 1-139144/1989. However, since an oxidation reaction and a reduction reaction are independent chemical reactions, the effect of accelerating the oxidation reaction and the reduction reaction is small, and it is necessary that the reducing reagent and the oxidizing reagent exist in a sufficient amount in a gaseous phase.

Moreover, as a method for electrochemically reducing $NO_x$, Japanese Unexamined Patent Publication NO. 4-305227/1992 discloses a device in which a gas containing $NO_x$ is supplied to a cathode side and a gas mixture containing hydrogen and CO is supplied to an anode side so that electric power is generated at 650° C. by using a fused carbonate as an electrolyte, and an electromotive force of at least 800 mV is obtained as a releasing voltage. However, this system has been invented as a combustion exhaust processing method for a power plant, and it can not be applied to an automobile from the viewpoint of volume, weight, control, costs and the like.

Furthermore, as a method for electrochemically reducing $NO_x$, Japanese Unexamined Patent Publication NO. 7-275714/1995 discloses a device in which a gas containing $NO_x$ is supplied to a cathode side, and a voltage is applied between cathode and anode at 500 to 700° C. by using a solid electrolyte of zirconia stabilized with yttria as an electrolyte, so that an electrolytic process is carried out to reduce $NO_x$, thereby releasing oxygen from the cathode. And Japanese Unexamined Patent Publication NO. 8-332342/1998 discloses a device in which an electrolytic process is carried out at 400 to 1000° C. by using perovskite ceramics as an ion conductor conductive and an electron conductive material so that $NO_x$ is reduced, thereby releasing oxygen from the cathode. However, these systems have also been devised as a combustion exhaust processing method for a power plant, and have not been applied to an automobile from the viewpoint of volume, weight, control, costs, and the like.

As described above, in the conventional catalyst for exhaust purification, an oxidation reaction and a reduction reaction are simultaneously carried out on the same catalyst particle, so $NO_x$ can not be reduced unless a reducing reagent such as HC, CO or hydrogen exists in a sufficient concentration in a gaseous phase. Therefore, in case of driving at a lean atmosphere, it is necessary to temporarily switch to a rich atmosphere to reduce $NO_x$ absorbed in an $NO_x$ absorbing substance.

The present invention has been carried out to solve the above-mentioned conventional problems, and its object is to provide a catalyst for exhaust purification which can sufficiently function even at a lean atmosphere by electrochemically carrying out an oxidation reaction and a reduction reaction, not by simply carrying out a chemical catalytic reaction as in the conventional catalyst for exhaust purification.

Additionally, an "electrochemical catalyst" for electrochemically carrying out an oxidation reaction and a reduction reaction by using at least two kinds of catalyst was disclosed in Japanese Unexamined Patent Publication NO. 10-270055/1998, which was previously filed by the inventors of the present invention. Moreover, a method for improving poisoning resistance to CO of a fuel battery by using the "electrochemical catalyst" was disclosed in Japanese Unexamined Patent Publication NO. 10-270056/1998, which was previously filed by the inventors of the present invention. The present invention has been made by basically applying the above-mentioned "electrochemical catalyst" for an exhaust purification catalyst, and the effect of the "electrochemical catalyst" under a special environment of the exhaust is improved by providing an $NO_x$ absorbing substance and a hydrocarbon adsorption substance.

SUMMARY OF THE INVENTION

The present invention relates to an electrochemical catalyst for exhaust purification comprising a catalyst A containing an $NO_x$ absorbing substance and an $NO_x$ reducing catalyst, a catalyst B containing a hydrocarbon adsorption substance and a hydrocarbon lo oxidizing catalyst, an electron conductive substance C, and an ion conductive substance D.

Moreover, the electron conductive substance C is a metal honeycomb, and the metal honeycomb is preferably coated with a mixture comprising the catalyst A, the catalyst B, and the ion-conductive substance D. Furthermore, the electron-conductive substance C and the ion-conductive substance D are preferably a solid electrolyte comprising a composite of an ion conductor and an electron conductor.

DETAILED DESCRIPTION

Embodiments of the present invention are explained below by referring to FIGS. 1 to 6.

EMBODIMENT 1

Figure 1:
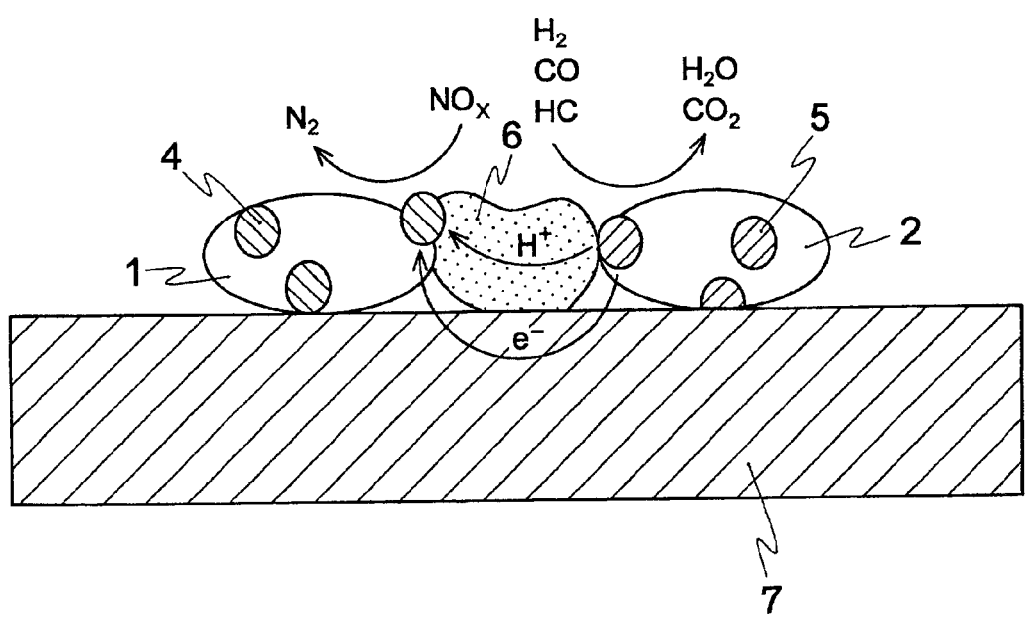
FIG. 1 is a schematic view that shows a catalyst for exhaust purification in Embodiment 1 (proton conduction).

FIG. 1 is a schematic view that shows a catalyst for exhaust purification in Embodiment 1. In the FIG., 1 represents a catalyst A containing an $NO_x$ absorbing substance and an $NO_x$ reducing catalyst, 2 represents a catalyst B containing a hydrocarbon (HC) adsorption substance and an HC oxidizing catalyst, 4 represents a particle of noble metal reducing catalyst, 5 represents a particle of noble metal oxidizing catalyst, 6 represents an ion conductive solid electrolyte, and 7 represents a metal honeycomb. Solid-line arrows in the solid electrolyte 6 indicate flow of electrons ($e^-$) and flow of ions (protons: $H^+$). In Embodiment 1, the solid electrolyte 6 deals with only ion conduction and the metal honeycomb 7 deals with electron conduction.

Since the metal honeycomb 7 can maintain a sufficient strength even if it is thinner than a ceramics honeycomb, pressure loss thereof becomes low. Moreover, since it also has advantages such as excellent heat conduction, it is coated with a catalyst for exhaust purification as a material that can replace the conventional ceramics honeycombs such as cordierite, and has been used by assembling it into an automobile muffler. For example, Japanese Unexamined Patent Publication NO. 5-301048/1998 discloses a metal honeycomb used in an automobile catalyst for exhaust purification.

Concrete compositions, processes for preparation arid evaluation results including Comparative Examples are shown in Examples. In the present Embodiment 1, the basic construction of the present invention wherein protons are used as an ion conductor and the reasons for revealing effects are explained in detail by referring to FIGS. 1 and 2.

There were mixed the catalyst A containing an $NO_x$ absorbing substance and an $NO_x$ reducing catalyst, the catalyst B containing a hydrocarbon (HC) adsorption substance and an HC oxidizing catalyst, and the ion conductive solid electrolyte 6, and the metal honeycomb 7 is coated with this mixture. Since the metal honeycomb 7 and the solid electrolyte 6 respectively transmit electrons and ions, an electrochemical reduction reaction proceeds on the catalyst A while an electrochemical oxidation reaction proceeds on the catalyst B, in a separate manner from each other. And the process for reducing the absorbed $NO_x$ can be carried out by using adsorbed hydrocarbon, without frequently switching the exhaust atmosphere to the rich atmosphere.

Figure 2A:
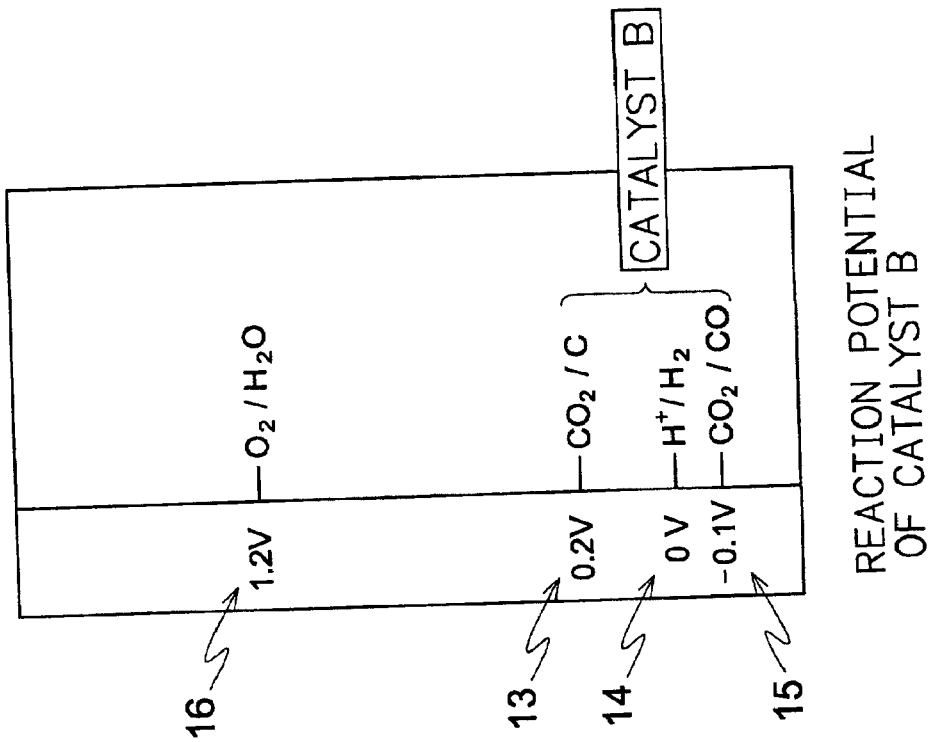
FIGS. 2(a) and 2(b) are graphs that show electrochemical potential indicating an electrochemical reaction of a catalyst for exhaust purification in Embodiments 1 to 3 (proton conduction).
Figure 2B:
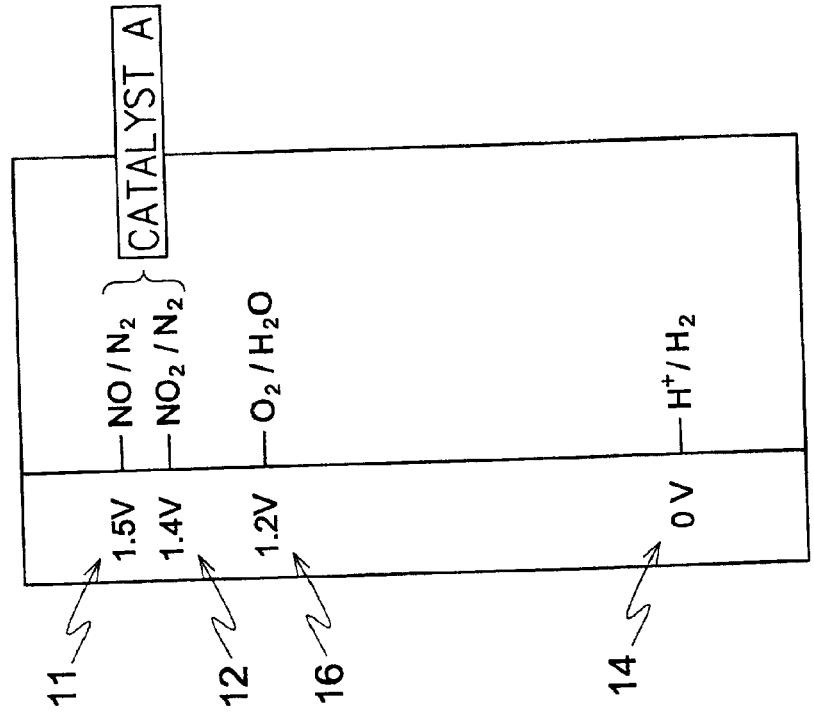

FIGS. 2(a) and (b) are graphs that show electrochemical potential indicating an electrochemical reaction between the reducing catalyst of the catalyst A and the oxidizing catalyst of the catalyst B. In the FIG., 11 represents a reducing electric potential of nitrogen monoxide, 12 represents a reducing electric potential of nitrogen dioxide 2, 13 represents an oxidizing electric potential of carbon, 14 represents an oxidizing electric potential of hydrogen, 15 represents an oxidizing electric potential of carbon monoxide, and 16 represents a reducing electric potential of oxygen. These electrochemical electric potentials are based upon the reversible electric potential of hydrogen. Reducing electric potentials of NO and $NO_2$ are respectively represented by the following formulas (1) and (2), and the oxidizing electric potentials of C, $H_2$ and CO are respectively represented by the following formulas (3), (4), and (5). Since hydrocarbon (HC) is a general term for various hydrocarbons such as methane and propane, carbon (C) is typically exemplified in this case. But in any cases, the electric potential is about 0 V.

[Reducing Electric Potential]

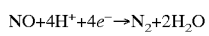 (1) $E=1.495$ V

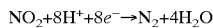 (2) $E=1.363$ V

[Oxidizing Electric Potential]

 (3) $E=0.207$ V

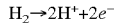 (4) $E=0.000$ V

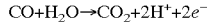 (5) $E=-0.103$ V

The reduction reaction is a reaction in which electrons ($e^-$) and ions (protons; $H^+$) are generated, and the reaction is not allowed to proceed rightwards, unless these are consumed. Namely, NO and $NO_2$ are not reduced. On the other hand, the oxidation reaction is a reaction in which electrons ($e^-$) and ions (protons; $H^+$) are consumed, the reaction is not allowed to proceed rightwards, unless these are supplied. Namely, C, $H_2$ and CO are not oxidized. However, the reducing electric potentials of the above-mentioned formulas (1) and (2) is above 1 V, while the oxidizing electric potentials of the above-mentioned formulas (3) to (5) are about 0 V. Therefore, an electric motive force exists therebetween, reactions can take place on the respective catalysts and a battery is constituted to generate electric power. In this case, the metal honeycomb 7 and the solid electrolyte 6 respectively serve as paths for electrons and ions, the reactions of formulas (1) to (5) proceed. This is a state in which the reducing electric potential and the oxidizing electric potential are short-circuited, and this state corresponds to a state in which a battery is short-circuited. A current flowing at this time is controlled by electronic resistance and ion conductive resistance.

Additionally, FIG. 1 schematically shows a case in which one reducing catalyst particle of the catalyst A and one oxidizing catalyst particle of the catalyst B are connected through the metal honeycomb 7 and the solid electrolyte 6. In fact, a plurality of reducing catalyst particles and a plurality of oxidizing catalyst particles are connected to each other through solid electrolyte 6 that is entangled in the form of network, and the reactions proceed through various routes. This state is similar to a state in which a mixture of a catalyst and an electrolyte is applied to an electrode substrate. And in the same manner as a fuel battery and the other various batteries using such a structure, the connection between the catalyst and the metal honeycomb is sufficiently attained through the solid electrolyte. Moreover, since the solid electrolyte has slight electron conductivity, even catalyst particles apart from the metal honeycomb maintain sufficient electronic connection to proceed the reactions, although there is resistance in electron movement.

EMBODIMENT 2

Figure 3:
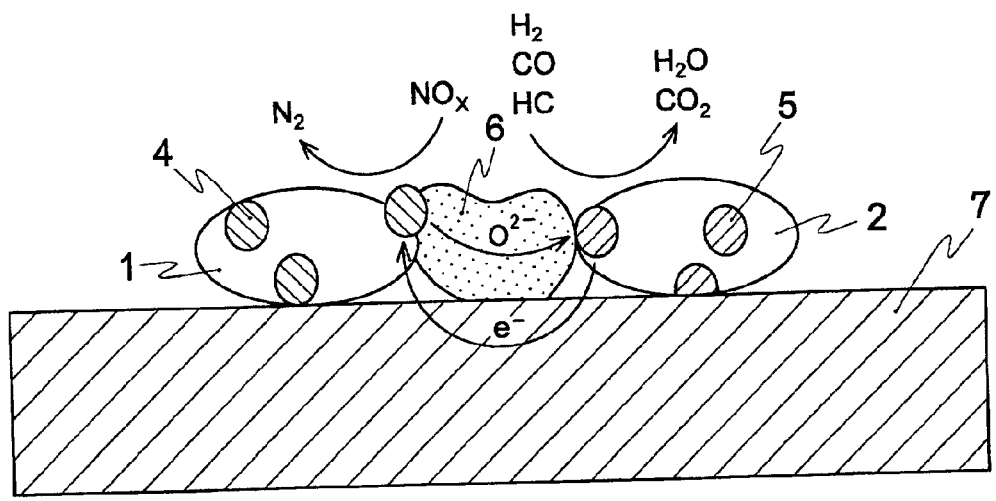
FIG. 3 is a schematic view that shows a catalyst for exhaust purification in Embodiment 2 (oxygen ion conduction).

FIG. 3 is a schematic view that shows an electrochemical catalyst for exhaust purification in Embodiment 2.

As the state of ion conduction, Embodiment 2 does not show the proton conduction, but the oxygen ion conduction. In case of the oxygen ion conduction, the reactions of the above-mentioned formulas (1) to (5) are respectively replaced by the reactions shown in the following formulas (6) to (10), but the reactants and the like are basically the same.

[Reducing Electric Potential]

 (6)

 (7)

[Oxidizing Electric Potential]

 (8)

 (9)

 (10)

As the solid electrolyte 6 having ion conductivity, for example, there are perovskite ceramics disclosed in Japanese Unexamined Patent Publication NO. 8-332342/1996, and this can be used at an operation temperature and an atmosphere suitable for a catalyst for exhaust purification. Moreover, there may be used a solid electrolyte 6 having electron conductivity and ion conductivity and, for example, a composite material comprising an ion conductor $La_{1-x}Sr_xGa_{1-y}Mg_yO_3$ (0.05<X<0.3,0.1<Y<0.3) and an electron conductor $La_{1-x}Sr_xMnO_3$ (0.05<X<0.3) as disclosed in Japanese Unexamined Patent Publication NO. 10-255832/1998. In these solid electrolytes, oxygen ions mainly deal with the ion conduction of these solid electrolytes. But a solid electrolyte having both the proton conduction and the oxygen ion conduction has been investigated to provide a fuel battery of the solid electrolyte capable of operating at a lower temperature, and this type of electrolyte may also be used.

EMBODIMENT 3

Figure 4:
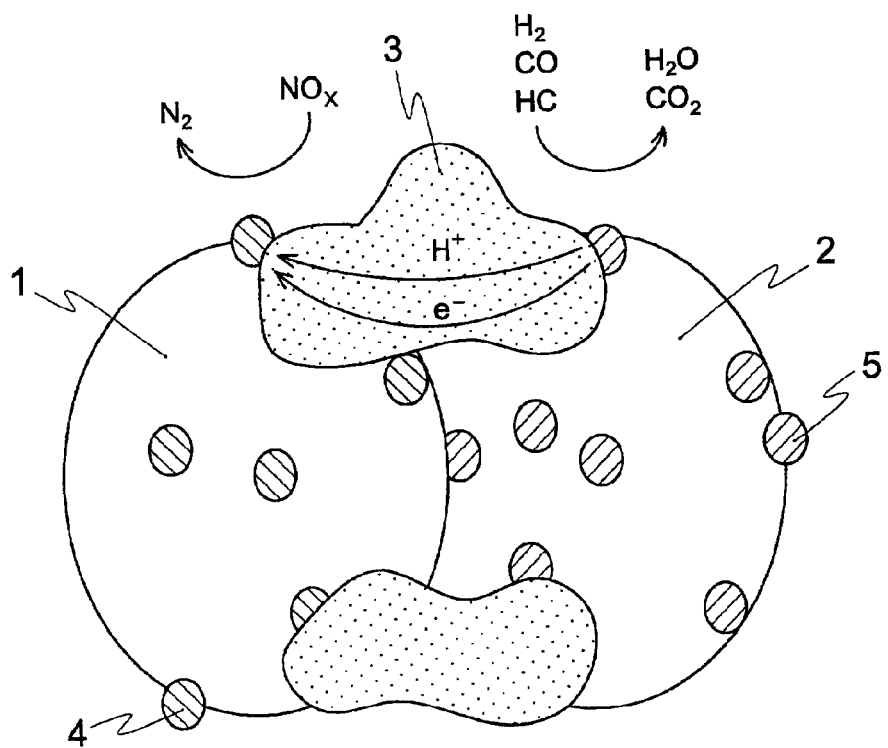
FIG. 4 is a schematic view that shows a catalyst for exhaust purification in Embodiment 3 (proton conduction).

FIG. 4 is a schematic view that shows a catalyst for exhaust purification in Embodiment 3. In this Figure, 1 represents a catalyst A containing an $NO_x$ absorbing substance and an $NO_x$ reducing catalyst, 2 represents a catalyst B containing a hydrocarbon (HC) adsorption substance and an HC oxidizing catalyst, 3 is a mixture of an electron conductive material C and an ion conductive substance D (solid electrolyte), 4 represents particles of noble metal reducing catalyst, 5 represents particles of noble metal oxidizing catalyst. And solid-line arrows in the solid electrolyte 3 indicate flow of electrons and flow of ions (protons).

Concrete compositions, methods for preparation and evaluation results including Comparative Examples are shown in Examples. In the present Embodiment 3, the basic construction of the present invention wherein protons are used as ion conductor and the reasons for revealing effects are explained in detail by referring to FIGS. 4 and 2.

The mixture of the electron conductive material C and the ion conductive substance D transmit both ions and electrons by mixing the catalyst A containing an $NO_x$ absorbing substance and an $NO_x$ reducing catalyst, the catalyst B containing a hydrocarbon (HC) adsorption substance and an HC oxidizing catalyst and the mixture of an electron conductive material C and an ion conductive substance D. Therefore, an electrochemical reduction reaction proceeds on the catalyst A while an electrochemical oxidation reaction proceeds on the catalyst B, in a separate manner from each other. And the reducing process of the absorbed $NO_x$ can be carried out by using the adsorbed hydrocarbon, without temporarily switching the exhaust atmosphere to the rich atmosphere.

With respect to the electrochemical reactions and their electric potentials in the reducing catalyst of the catalyst A and the oxidizing catalyst of the catalyst B, they proceed as explained in Embodiment 2, except that the mixture of an electron conductive material C and an ion conductive substance D serve as paths of electrons and ions.

Additionally, FIG. 4 schematically shows a case in which one particle of reducing catalyst of the catalyst A and one particle of oxidizing catalyst of the catalyst B are connected through the mixture 3 of an electron conductive material C and an ion conductive substance D. In fact, a plurality of reducing catalyst particles and a plurality of oxidizing catalyst particles are connected to each other in the form of network through the entangled mixture of the electron conductive material C and the ion conductive substance D, and the reactions proceed through various routes.

EMBODIMENT 4

Figure 5:
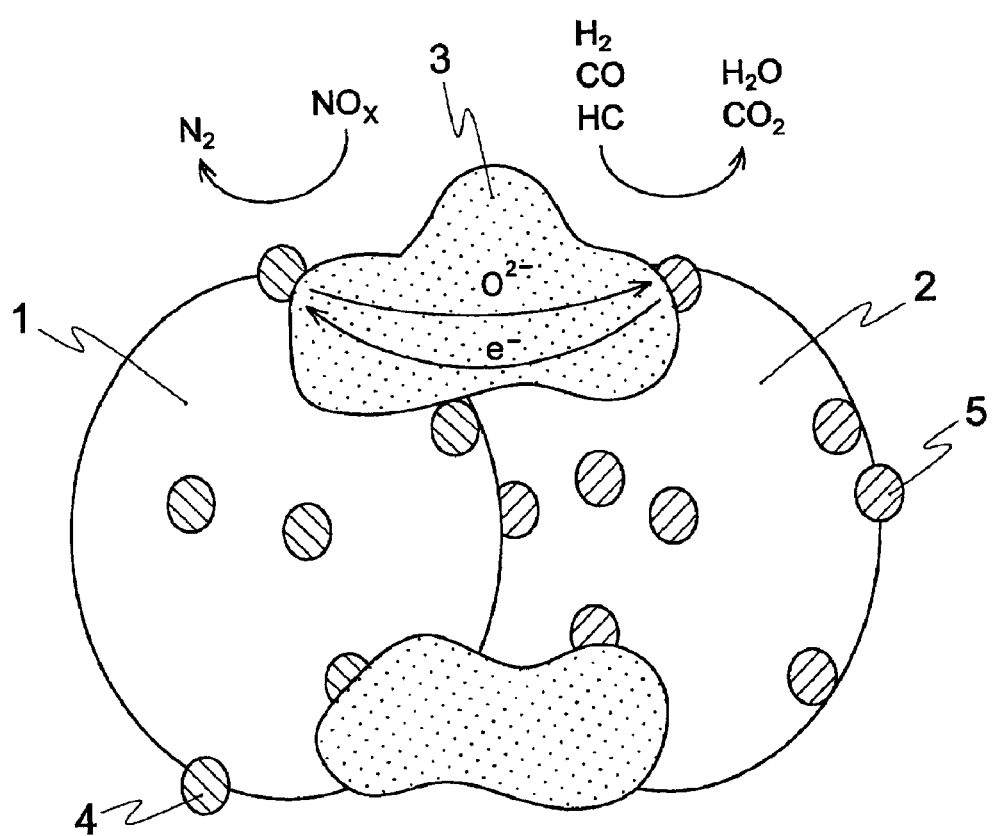
FIG. 5 is a schematic view that shows a catalyst for exhaust purification in Embodiment 4 (oxygen ion conduction).

FIG. 5 is a schematic view that shows an electrochemical catalyst for exhaust purification in Embodiment 4. With respect to the state of ion conduction, Embodiment 4 does not show the proton conduction, but the oxygen ion conduction. In case of the oxygen ion conduction, the reactions of the above-mentioned formulas (1) to (5) are respectively replaced by the reactions shown in the following formulas (6) to (10). But the reactants and the like are basically the same.

[Reducing Electric Potential]

$$2NO+4e^- \rightarrow N_2+2O^{2-} \qquad (6)$$

$$2NO_2+8e^{31} \rightarrow N_2+4O^{2-} \qquad (7)$$

[Oxidizing Electric Potential]

$$C+2O^{2-} \rightarrow CO_2+4e^- \qquad (8)$$

$$H_2+O^{2-} \rightarrow H_2O+2e^- \qquad (9)$$

$$CO+O^{2-} \rightarrow C0_2+2e^- \qquad (10)$$

As the solid electrolyte having electron conductivity and ion conductivity, for example, there are perovskite ceramics disclosed in Japanese Unexamined Patent Publication NO. 8-332342/1996, and it can be used at an operation temperature and an atmosphere suitable for a catalyst for exhaust purification. And as the solid electrolyte having electron conductivity and ion conductivity, there may be used a composite material comprising an ion conductor and an electron conductor. And for example, there can be used a composite material comprising an ion conductor $La_{1-x}Sr_xGa_{1-y}Mg_yO_3$ (0.05<X<0.3, 0.1<Y<0.3) and an electron conductor $La_{1-x}Sr_xMnO_3$ (0.05<X<0.3), which is disclosed in Japanese Unexamined Patent Publication NO. 10-255832/1998. Oxygen ions mainly deal with the ion conduction of these solid electrolytes, but a solid electrolyte having both the proton conduction and the oxygen ion conduction has been investigated to provide a fuel battery of the solid electrolyte, which can be operated at a lower temperature, and this type of electrolyte may also be used.

EMBODIMENT 5

Figure 6:
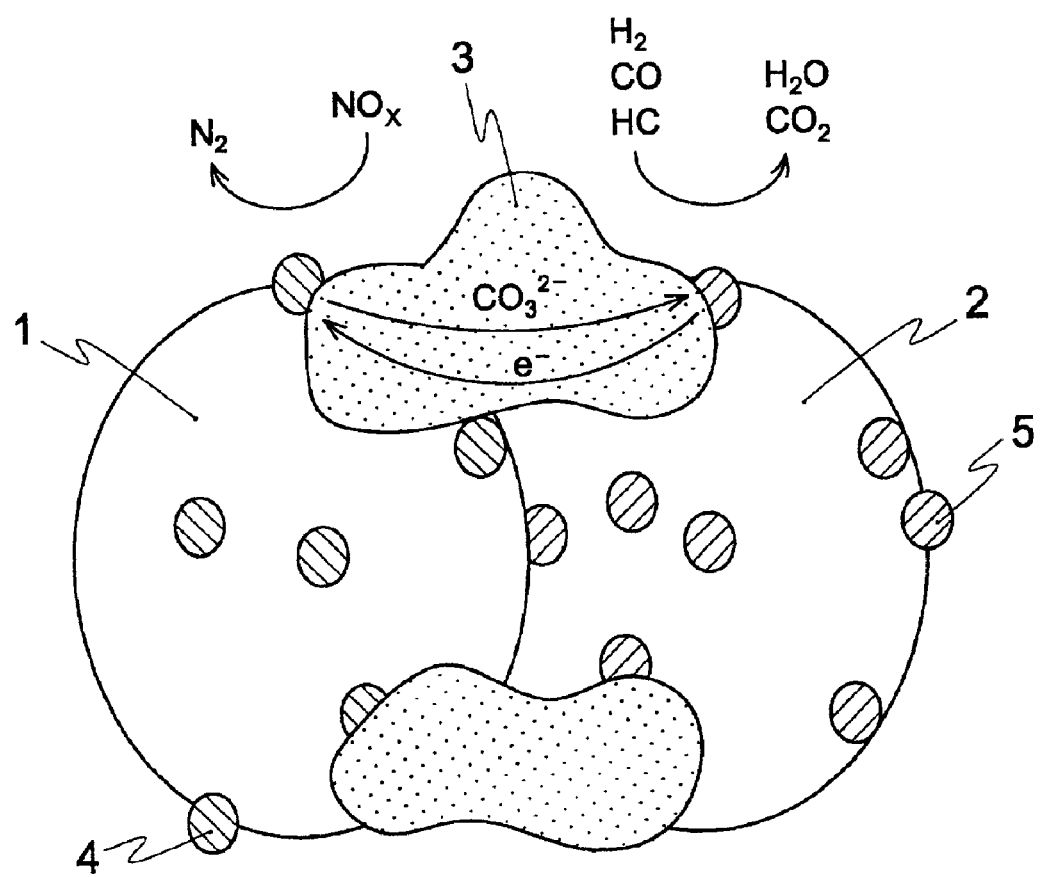
FIG. 6 is a schematic view that shows a catalyst for exhaust purification in Embodiment 5 (carbonate ion conduction).

FIG. 6 is a schematic view that shows an electrochemical catalyst for exhaust purification in Embodiment 5. With respect to the state of ion conduction, Embodiment 5 does not show the oxygen ion conduction, but the carbonate ion conduction. In case of the carbonate ion conduction, the reactions of the above-mentioned formulas (6) to (10) are respectively replaced by the reactions shown in the following formulas (11) to (15). But the reactants and the like are basically the same.

[Reducing Electric Potential]

$$2NO+2CO_2+4e^- \rightarrow N_2+2O_3^{2-} \qquad (11)$$

$$2NO_2+4CO_2+8e^- \rightarrow N_2+4O_3^{2-} \qquad (12)$$

[Oxidizing Electric Potential]

$$C+2CO_3^{2-} \rightarrow 3CO_2+4e^- \qquad (13)$$

$$H_2+CO_3^{2-} \rightarrow H_2O+CO_2+2e^- \qquad (14)$$

$$CO+CO_3^{2-} \rightarrow 2CO_2+2e- \qquad (15)$$

In the above-mentioned Embodiments 1 to 5, as the $NO_x$ absorbing substance, there can be used alkaline metals such as potassium or compounds thereof, alkaline earth metals such as calcium and barium or compounds thereof, and rare earth metals such as lanthanum or compounds thereof.

Moreover, as the noble metal catalysts of the catalyst A and the catalyst B, there may be used platinum (Pt), palladium (Pd), rhodium (Rh) and iridium (Ir) in a combination use thereof.

The effects of the above-mentioned embodiments are explained by using Examples, Comparative Examples and the evaluation results thereof, and also the method for preparing the catalyst for exhaust purification of the present invention. The catalyst A and the catalyst B were previously prepared according to the following methods, and used in the following Examples 1 to 7 and Comparative Examples 1 to 2.

[Preparation of Catalyst A]

Alumina powder (500 g) was impregnated with an aqueous solution of barium acetate, and the mixture was dried at 110° C. for three hours. The mixture was calcined at 500° C. for one hour to obtain Ba on alumina powder having an amount of Ba of 2 mole per 1 kg of alumina. The powder was immersed in 20 g/liter of an aqueous solution of ammonium bicarbonate for 15 minutes, and then dried at 110° C. for three hours after filtration to prepare alumina powder with barium carbonate.

This alumina powder with barium carbonate was impregnated with an aqueous solution of dinitrodiamine platinum nitrate. This powder was dried at 110° C. for three hours, and then dried at 250° C. for two hours to be carried with platinum, and thereby preparing the catalyst A. An amount of platinum was 20 g per 1 kg of the barium carbonate on alumina powder.

[Preparation of Catalyst B]

Zeolite powder of the mordenite type (300 g) was suspended in an aqueous solution of zirconium hydroxy nitrate, and to the mixture was added an aqueous solution of ammonium to adjust the pH to at least 8. The mixture was filtered, dried at 110° C., and then calcined at 500° C. for one hour. The powder was dispersed in an aqueous solution of rhodium nitrate, filtered, dried at 110° C., and then calcined at 400° C. for one hour, thereby preparing a catalyst B. An amount of rhodium was 2 g per 600 g of the zeolite powder.

EXAMPLE 1

To a mortar was added 10 g of high-purity lanthanum oxide powder (available from Santoku Metal Industry Co., Ltd.), 10 g of strontium carbonate powder and 4.5 g of high-purity scandium powder (available from Santoku Metal Industry Co., Ltd.), and they were mixed and ground. This was loaded into an electric furnace, and sintered at 1600° C. in an air atmosphere for 10 hours to form powder of a composite oxide of perovskite with proton conductivity (identified as $La_{0.9}Sr_{0.1}ScO_3\text{-}\alpha$)($\alpha<0.25$) by X-ray diffraction).

There were mixed 50 g of the catalyst A, 50 g of the catalyst B and 20 g of the composite oxide of perovskite with proton conductivity to prepare mixed powder.

Next, to refined water was added this mixed powder, and formed into a slurry by using castapal D (available from Vista Chemical Co.) as a binder. And this slurry was applied to a metal honeycomb substrate having a honeycomb shape, which was made of an Fe—Al—Cr alloy by using the wash-coating method. This was dried at 250° C., and then calcined at 600° C. for 20 minutes to form a coating layer, and it was used as a catalyst in Example 1.

Since the ion conduction in Example 1 is carried out by protons, this example corresponds to Embodiment 1.

EXAMPLE 2

The same processes as Example 1 were carried out to obtain powder of a composite oxide of perovskite with oxygen ion conductivity (identified as $La_{0.8}Sr_{0.2}Ga_{0.85}Mg_{0.15}O_3$ by X-ray diffraction).

There were mixed 50 g of the catalyst A, 50 g of the catalyst B and 30 g of the composite oxide of perovskite with oxygen ion conductivity to prepare the mixed powder.

Next, to refined water was added this mixed powder, and formed into a slurry by using castapal D (available from Vista Chemical Co.) as a binder, and this slurry was applied to a metal honeycomb substrate having a honeycomb shape, which was made of an Fe—Al—Cr alloy by using the wash-coating method. This was dried at 250° C., and then calcined at 600° C. for 20 minutes to form a coating layer, and it was used as a catalyst in Example 2.

Since the ion conduction in Example 2 is carried out by oxygen ions, this example corresponds to Embodiment 2.

EXAMPLE 3

Powder of zirconia stabilized by yttria ($ZrO_2$—$Y_2O_3$) (20 g) as the solid electrolyte was mixed with 50 g of the catalyst A and 50 g of the catalyst B to prepare mixed powder.

To refined water was added this mixed powder, and formed into a slurry by using castapal D (available from Vista Chemical Co.) as a binder, and this slurry was applied to a metal honeycomb substrate having a honeycomb shape, which was made of an Fe—Al—Cr alloy by using the wash-coating method. This was dried at 250° C., and then calcined at 600° C. for 20 minutes to form a coating layer, and it was used as a catalyst in Example 3.

The ion conduction in Example 3 is carried out by oxygen ions, this example corresponds to Embodiment 2.

COMPARATIVE EXAMPLE 1

To refined water was added 50 g of the catalyst A and 50 g of the catalyst B, and formed into a slurry by using castapal D (available from Vista Chemical Co.) as a binder, and this slurry was applied to a metal honeycomb substrate having a honeycomb shape, which was made of an Fe—Al—Cr alloy by using the wash-coating method. This was dried at 250° C., and then calcined at 600° C. for 20 minutes to form a coating layer, and it was used as a catalyst in Comparative Example 1.

[Evaluation Test]

With respect to the total four catalysts coated on the metal honeycomb substrates in Examples 1 to 3 and Comparative Example 1, the NOx removing effects were evaluated by using gases simulated for exhaust.

As the gases simulated for exhaust, two kinds of gases of a gas simulated for lean exhaust and a gas simulated for rich exhaust were prepared. Table 1 shows gas compositions of the gases simulated for lean exhaust and the gas simulated for rich exhaust.

TABLE 1

| | HC (ppm) | CO (%) | NO (ppm) | $CO_2$ (%) $H_2O$ (%) | $O_2$ (%) |
|---|---|---|---|---|---|
| lean exhaust | 2000 | 0.1 | 500 | 10 10 | 6.5 |
| rich exhaust | 2000 | 0.6 | 500 | 10 10 | 0.4 |

The evaluation tests were carried out by using a method in which the metal honeycomb was maintained at 500° C. by an electric heater, and the gas simulated for rich exhaust and the gas simulated for lean exhaust were alternately supplied thereto to measure the variation of $NO_x$. The intervals between the rich exhaust and the lean exhaust were set to two times, namely, two minutes interval and five minutes interval.

Figure 7:
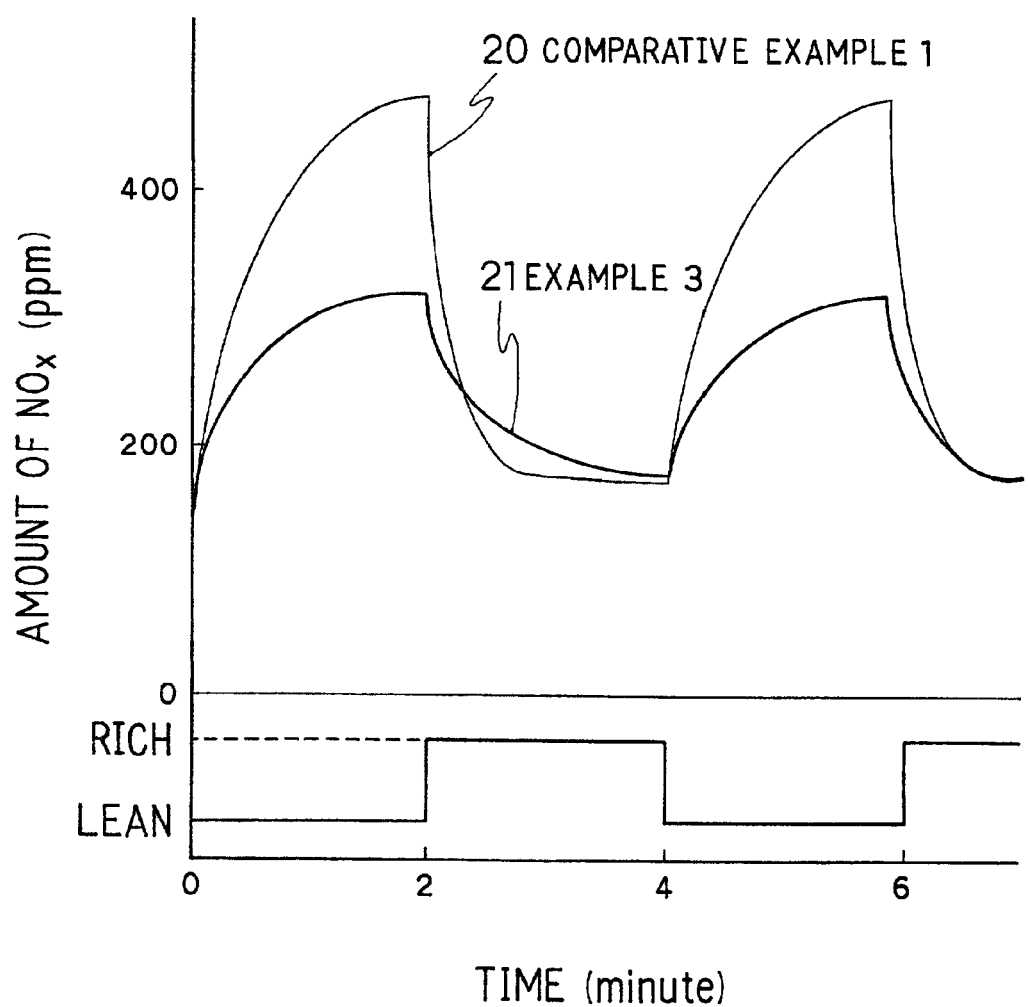
FIG. 7 is a graph that shows changes of the concentration of $NO_x$ in Example 3 and Comparative Example 1 in case that the time interval between a rich exhaust and a lean exhaust is set to 2 minutes.

FIG. 7 shows graphs that indicate changes of the concentration of $NO_x$ in Example 3 and Comparative Example 1 in case that the time interval between the rich exhaust and the lean exhaust was set to two minutes. In Comparative Example 1, at the lean exhaust, $NO_x$ could not be absorbed as time elapsed, and then an amount of exhausted $NO_x$ increased. Moreover, in the rich exhaust, $NO_x$ was reduced by HC, CO and the like, while $NO_x$ was released from the $NO_x$ absorbing catalyst, and also reduced by HC, CO and the like. On the other hand, in case of the catalyst in Example 3, an increase in the amount of exhausted $NO_x$ became smaller than that in Comparative Example. This is because the adsorbed HC reduces $NO_x$ electrochemically. In Comparative Example 1, although it has a capability of adsorbing HC, since it is exhausted into a gaseous phase, the probability of HC and $NO_x$ encountering and reacting on the same catalyst becomes low. Therefore, the effect as high as Example 3 is not revealed.

Table 2 shows the evaluation results of $NO_x$ purification ratio, which was calculated from the average $NO_x$ concentrations in Examples 1 to 3 and Comparative Example 1, in case that the time interval between the rich exhaust and the lean exhaust is set to two minutes.

TABLE 2

| | ion conduction | ion conductive substance | $NO_x$ purification ratio (%) |
|---|---|---|---|
| Example 1 | proton | $La_{0.9}Sr_{0.1}ScO_{3-\alpha}$ | 62 |
| Example 2 | oxygen ion | $La_{0.9}Sr_{0.2}Ga_{0.85}Mg_{0.15}O_3$ | 63 |
| Example 3 | oxygen ion | $ZrO_2$—$Y_2O_3$ | 65 |
| Comparative Example 1 | nothing | nothing | 56 |

As is clearly shown from Table 2, in any cases of Examples 1 to 3, the $NO_x$ purification ratio became higher than that in Comparative Example 1, and thereby the effect of the present invention is proved.

Figure 8:
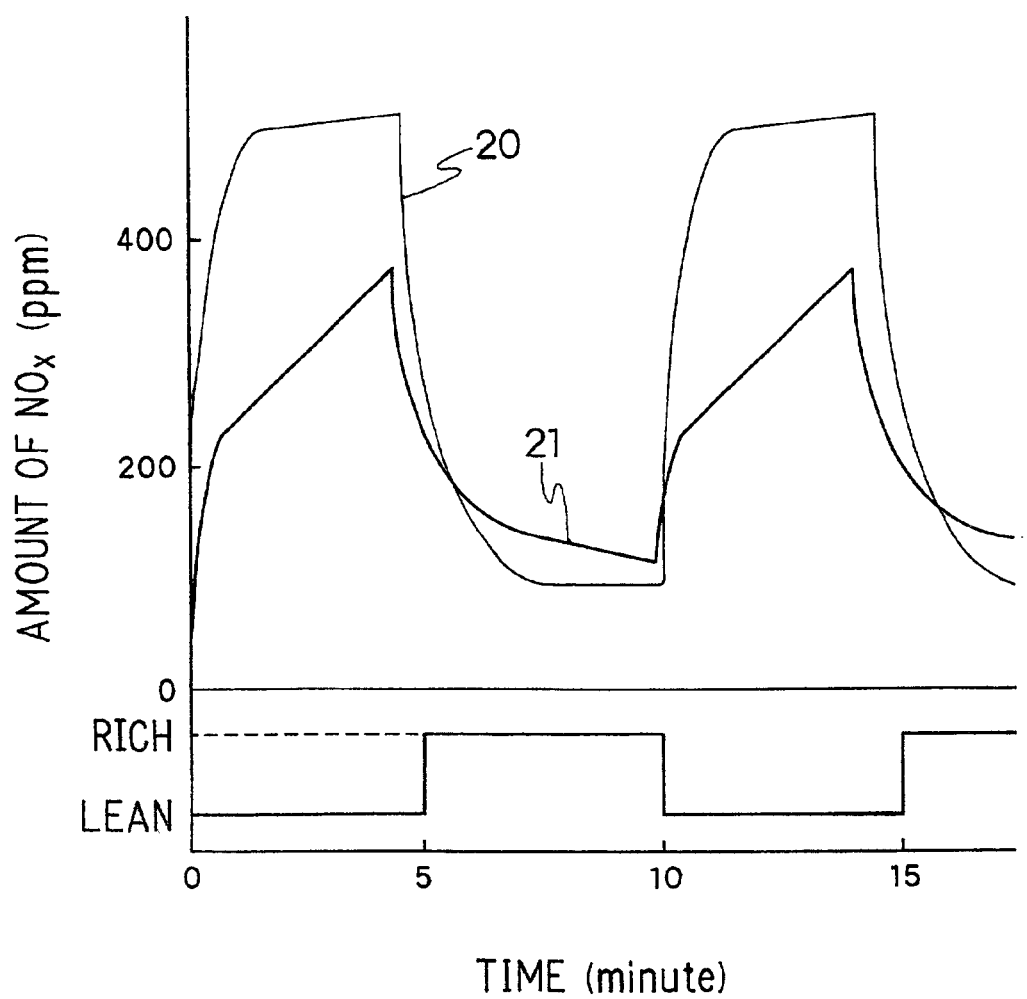
FIG. 8 is a graph that shows changes of the concentration of $NO_x$ in Example 3 and Comparative Example 1 in case that the time interval between a rich exhaust and a lean exhaust is set to 5 minutes.

FIG. 8 shows graphs that indicate changes of the concentration of $NO_x$ in Example 3 and Comparative Example 1 in case that the time interval between the rich exhaust and the lean exhaust was set to five minutes. In Comparative Example 1, there was a limit in the amount of possible absorption and storage of $NO_x$ and the saturated amount was easily reached. On the hand, in Example 3, the concentration level was maintained low, the absorbed $NO_x$ and the absorbed HC were reacted electrochemically so that the amount of possible absorption and storage that $NO_x$ was greatly increased. Therefore, it was proved that $NO_x$ reducing process was practicable without providing frequent rich spikes.

Table 3 shows the evaluation results of $NO_x$ purification radio, which was calculate from the average $NO_x$ concentrations in Examples 1 to 3 Comparative Example 1, in case that time interval between the rich exhaust and the lean exhaust was set to five minutes.

TABLE 3

| | ion conduction | ion conductive substance C | $NO_x$ purification ratio (%) |
|---|---|---|---|
| Example 1 | proton | $La_{0.9}Sr_{0.1}ScO_{3-\alpha}$ | 60 |
| Example 2 | oxygen ion | $La_{0.9}Sr_{0.2}Ga_{0.85}Mg_{0.15}O_3$ | 62 |
| Example 3 | oxygen ion | $ZrO_2$—$Y_2O_3$ | 65 |
| Comparative Example 1 | nothing | nothing | 48 |

In any cases in Examples 1 to 3, the $NO_x$. purification ratio became higher than in Comparative Example 1. And as compared with Table 2, even if the interval of lean exhaust was set to longer time, a sufficient $NO_x$ purification ratio was maintained and difference between Examples and Comparative Example became large. It was proved that the present invention particularly provided greater effects in case that the interval of lean exhaust was long. A interval of lean exhaust of at least 5 minutes means that virtually no rich spike is required. This is because in a normal driving mode, a rich or stoichiometric mode naturally takes place due to variation in the driving load within five minutes. Therefore, it is possible to eliminate any complex controlling operations and detection of $NO_x$ absorbing and storing capability required for rich spikes, and from this point of view it becomes possible to greatly reduce cost.

EXAMPLE 4

There were mixed 50 g of the catalyst A, 50 g of the catalyst B, 20 g of the same composite oxide of perovskite with proton conductivity as in Example 1, and 20 g of nickel fine powder to prepare the mixed powder.

Next, to refined water was added this mixed powder, and formed into a slurry by using castapal D (available from Vista Chemical Co.) as a binder, and this slurry was applied to a ceramics honeycomb substrate, which was made of cordierite by using the wash-coating method. This was dried at 250° C., and then calcined at 600° C. for 20 minutes to form a coating layer, and it was used as a catalyst in Example 4.

The ion conduction in Example 4 is carried out by protons, and this example corresponds to Embodiment 3.

EXAMPLE 5

Powder of a composite oxide of perovskite with electron ion conductivity (identified as $La_{0.8}Sr_{0.2}MnO_3$ by X-ray diffraction) was prepared by the same processes as in Example 1.

There were mixed the same composite oxide of perovskite with oxygen ion conductivity as in Example 2 and the composite oxide of perovskite with electron ion conductivity in a weight ratio of 1:1. This was calcined at 1100° C. to form a composite oxide of perovskite having both functions of oxygen ion conductivity and electron ion conductivity. And this was pulverized into powder.

There were mixed 50 g of the catalyst A, 50 g of the catalyst B and 30 g of the composite oxide of perovskite having both functions of oxygen ion conductivity and electron ion conductivity to prepare the mixed powder.

Next, to refined water was added this mixed powder, and formed into a slurry by using castapal D (available from Vista Chemical Co.) as a binder, and this slurry was applied to a ceramics honeycomb substrate, which was made of cordierite by using the wash-coating method. This was dried at 250° C., and then calcined at 600° C. for 20 minutes to form a coating layer, and it was used as a catalyst in Example 5.

The ion conduction in Example 5 is carried out by oxygen ions, and this example corresponds to Embodiment 4.

EXAMPLE 6

To powder of the same composite oxide of perovskite with electron ion conductivity (identified as $La_{0.8}Sr_{0.2}MnO_3$ by X-ray diffraction) as in Example 5 was added powder of zirconia stabilized by yttria ($Zro_2$—$Y_2O_3$) and this was mixed. This mixed powder was calcined at 1100° C. to form a composite oxide having both functions of oxygen ion conductivity and electron ion conductivity, and this was pulverized into powder.

There were mixed 50 g of the catalyst A, 50 g of the catalyst B and 30 g of the composite oxide having both functions of oxygen ion conductivity and electron ion conductivity to prepare the mixed powder.

Next, to refined water was added this mixed powder, and formed into a slurry by using castapal D (available from Vista Chemical Co.) as a binder, and this slurry was applied to a ceramics honeycomb substrate, which was made of cordierite by using the wash-coating method. This was dried at 250° C., and then calcined at 600° C. for 20 minutes to form a coating layer, and it was used as a catalyst in Example 6.

The ion conduction of Example 6 is carried out by oxygen ions, and this example corresponds to Embodiment 4.

EXAMPLE 7

To powder of Ni dissolved in water were added lithium carbonate and sodium carbonate, and this was mixed, dried at 250° C., and then pulverized to form the mixed powder of Ni-fused carbonate.

There were mixed 50 g of the catalyst A, 50 g of the catalyst B and 30 g of the mixed powder of Ni-fused carbonate to form the mixed powder.

Next, this mixed powder was added to refined water, and formed into a slurry by using castapal D (available from Vista Chemical Co.) as a binder, and this slurry was applied to a ceramics honeycomb substrate, which was made of cordierite by using the wash-coating method. This was dried at 250° C., and then calcined at 600° C. for 20 minutes to form a coating layer, and it was used as a catalyst in Example 7.

The ion conduction of Example 7 is carried out by carbonate ions, and this example corresponds to Embodiment 5.

COMPARATIVE EXAMPLE 2

To refined water was added 50 g of the catalyst A and 50 g of the catalyst B, and formed into a slurry by using castapal D (available from Vista Chemical Co.) as a binder, and this slurry was applied to a ceramics honeycomb substrate, which was made of cordierite by using the wash-coating method. This was dried at 250° C., and then calcined at 600° C. for 20 minutes to form a coating layer, and it was used as a catalyst in Comparative Example 2.

[EVALUATION TEST]

With respect to the catalysts coated on ceramics honeycomb substrates made of cordierite of Examples 4 to 7 and Comparative Example 2, the $NO_x$ removing effects were evaluated by using gases simulated for exhaust.

As the gases simulated for exhaust, two kinds of gases of a gas simulated for lean exhaust and a gas simulated for rich exhaust were prepared, which were shown in Table 1. The evaluation tests were carried out by using a method in which each of the ceramics honeycomb substrate made of cordierite was maintained at 500° C. by an electric heater, and the gas simulated for rich exhaust and the gas simulated for lean exhaust were alternately supplied thereto with constant intervals to measure the variation of $NO_x$. The intervals between the rich exhaust and the lean exhaust were set to two times, namely, two minutes interval and five minutes interval.

Figure 9:
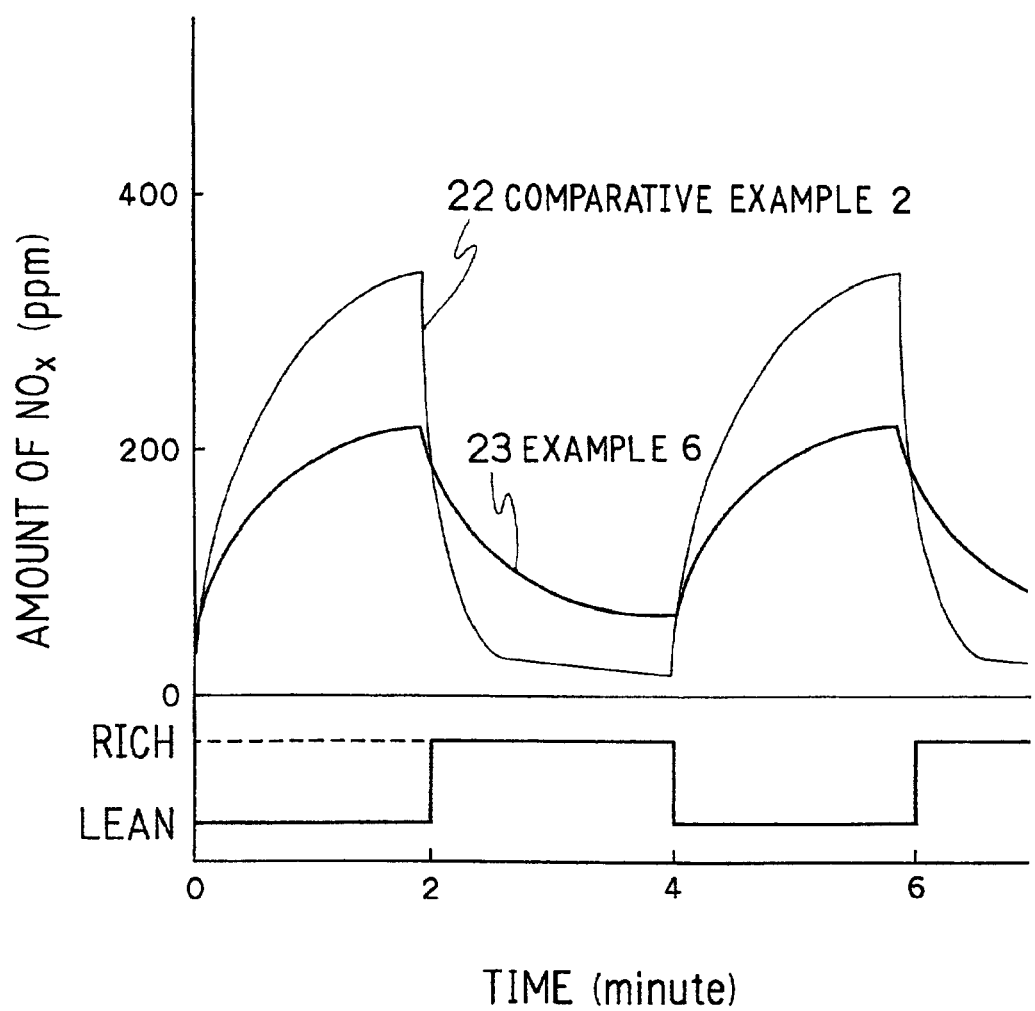
FIG. 9 is a graph that shows changes in the concentration of $NO_x$ in Example 6 and Comparative Example 2 in case that the time interval between a rich exhaust and a lean exhaust is set to 2 minutes.

FIG. 9 shows graphs that indicates changes of the concentration of $NO_x$ in Example 6 and Comparative Example 2 in case that the interval between the rich exhaust and the lean exhaust was set to two minutes. In Comparative Example 2, in case of the lean exhaust $NO_x$ could not be absorbed as time elapsed, and then an amount of $NO_x$ increased. Moreover, in the rich exhaust, $NO_x$ was reduced by HC, CO and the like, while $NO_x$ was released from the $NO_x$ absorbing catalyst, and also reduced by HC, CO and the like.

On the other hand, in case of the catalyst in Example 6, at the lean exhaust, an increase in an amount of exhausted $NO_x$ became smaller than that in Comparative Example 2. This is because the adsorbed HC reduces $NO_x$. electrochemically. In Comparative Example 2, although it has a capability of adsorbing HC, since it is exhausted into a gaseous phase, the probability of HC and $NO_x$ encountering and reacting on the same catalyst becomes low. Therefore, the effect as high as Example 6 is not revealed.

Table 4 shows the evaluation results of an $NO_x$ purification ratio, which was calculated from the average $NO_x$ concentrations in Examples 4 to 7 and Comparative Example 2, in case that the time interval between the rich exhaust and the lean exhaust was set to two minutes.

TABLE 4

| | ion conduction | ion conductive substance C | electron conductive substance D | $NO_x$ purification ratio (%) |
|---|---|---|---|---|
| Example 4 | proton | $La_{0.9}Sr_{0.1}Sc_{C}O_{3-\alpha}$ | Ni (NiO) | 66 |
| Example 5 | oxygen ion | $La_{0.9}Sr_{0.2}Ga_{0.85}Mg_{0.15}O_3$ | $La_{0.9}Sr_{0.2}MnO_3$ | 70 |
| Example 6 | oxygen ion | $ZrO_2$—$Y_2O_3$ | $La_{0.9}Sr_{0.2}MnO_3$ | 75 |
| Example 7 | carbonate ion | Li/Na carbonate | Ni (NiO) | 68 |
| Comparative Example 2 | nothing | Nothing | nothing | 63 |

As is clearly shown from Table 4, in any cases of Examples 4 to 7, the $NO_x$ purification ratio became higher than that in Comparative Example 2, and thereby the effect of the present invention is proved.

Figure 10:
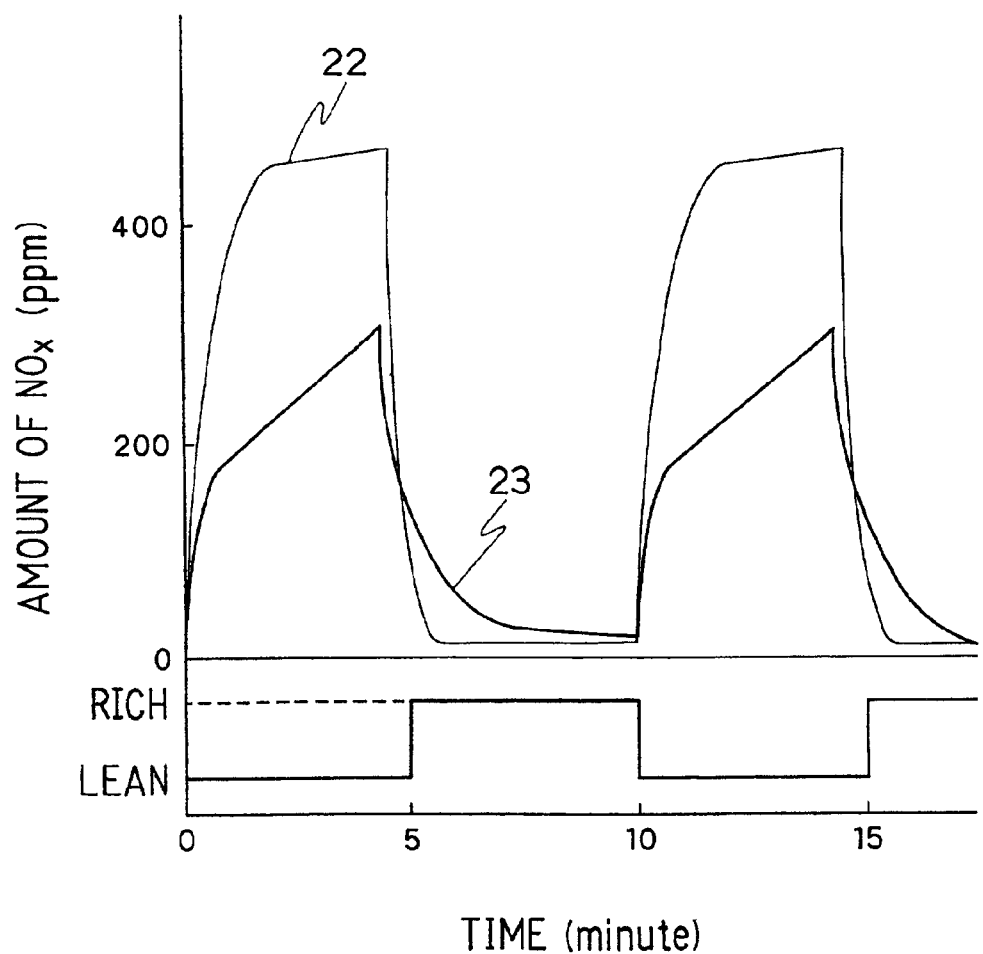
FIG. 10 is a graph that shows changes of the concentration of $NO_x$ in Example 6 and Comparative Example 2 in case that the time interval between a rich exhaust and a lean exhaust is set to 5 minutes.
Figure 11:
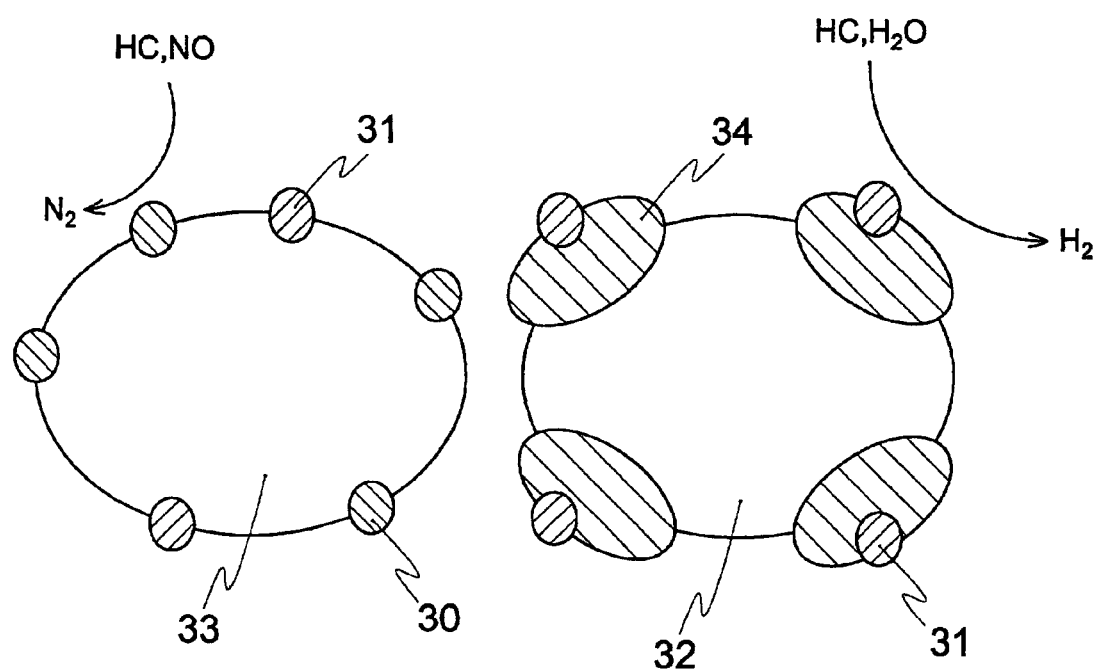
FIG. 11 is a schematic view that shows the conventional catalyst for exhaust purification.

FIG. 10 shows graphs that indicates changes of the concentration of $NO_x$ in Example 6 and Comparative Example 2 in case that the time interval between the rich exhaust and the lean exhaust was set to five minutes. In Comparative Example 2, there was a limit in the amount of possible absorption and storage of $NO_x$ and the saturated amount was easily reached. On the other hand, in Example 6, the concentration level was maintained low, the absorbed $NO_x$ and the absorbed HC were reacted electrochemically so that the amount of possible absorption and storage of $NO_x$ was greatly increased. Therefore, it was proved that an $NO_x$ reducing process was practicable without providing frequent rich spikes.

Table 5 shows evaluation results of $NO_x$ purifying ratio that was obtained from the average $NO_x$. concentrations in Examples 4 to 7 and Comparative Example 2, in case that the interval between the rich exhaust and the lean exhaust was set to five minutes.

TABLE 5

| | ion conduction | ion conductive substance C | electron conductive substance D | $NO_x$ purification ratio (%) |
|---|---|---|---|---|
| Example 4 | proton | $La_{0.9}Sr_{0.1}Sc_{C}O_{3-\alpha}$ | Ni (NiO) | 70 |
| Example 5 | oxygen ion | $La_{0.9}Sr_{0.2}Ga_{0.85}Mg_{0.15}O_3$ | $La_{0.9}Sr_{0.2}MnO_3$ | 72 |
| Example 6 | oxygen ion | $ZrO_2$—$Y_2O_3$ | $La_{0.9}Sr_{0.2}MnO_3$ | 75 |
| Example 7 | carbonate ion | Li/Na carbonate | Ni (NiO) | 68 |
| Comparative Example 2 | nothing | Nothing | nothing | 58 |

As is clearly shown from Table 5, in any cases of Examples 3 to 7, the $NO_x$ purification ratio became higher than that in Comparative Example 2. And as compared with Table 4, even if the interval of lean exhaust was set to longer time, a sufficient $NO_x$ purification ratio was maintained and difference between Examples and Comparative Example became large. It was proved that the present invention particularly provided greater effects in case that the interval of lean exhaust was long. An interval of lean exhaust of at least 5 minutes means that virtually no rich spike is required. This is because in a normal driving mode, a rich or stoichiometric mode naturally takes place due to variation in the driving load within five minutes. Therefore, it is possible to eliminate any complex controlling operations and detection of $NO_x$ absorbing and storing capability required for rich spikes, and from this point of view, it becomes possible to greatly reduce cost.

In Examples 1 to 7, the cases wherein Ba was used as the $NO_x$ absorbing substance were shown. But K or a mixture of Ba and K may be used, and these substances are suitable for purification of exhaust at a higher temperature, since the NOx absorbing effect thereof becomes large at a higher temperature. Moreover, for the purification of exhaust at a low temperature, it is preferable to use a rare earth metal such as La, as the $NO_x$ absorbing material.

In Examples 1 to 7, the cases wherein the ion conduction is protons, oxygen ion or carbonate ion are shown. But proton is suitable for exhaust purification at a low temperature, and oxygen ion is suitable for exhaust purification at a high temperature.

As described above, the catalyst for exhaust purification of the present invention comprises a catalyst A containing an $NO_x$ absorbing substance and an $NO_x$ reducing catalyst, a catalyst B containing a hydrocarbon adsorption substance and a hydrocarbon oxidizing catalyst, an electron-conductive substance C and an ion conductive substance D. Therefore, electrons can be moved between the catalyst A and the catalyst B through the electron conductive substance C, ions can be moved through the ion conductive substance D, so that an $NO_x$ reduction reaction and an oxidation reaction of hydrocarbon and the like are electrochemically carried out simultaneously. Consequently, even at a lean atmosphere, $NO_x$ absorbed in the $NO_x$ absorbing substance is gradually reduced by HC adsorbed in the hydrocarbon adsorption substance so that it is not necessary to frequently provide a rich mode. And it becomes possible to quickly treat $NO_x$, regardless of atmosphere.

What is claimed is:

1. An electrochemical catalyst for internal combustion engine exhaust purification comprising a catalyst A containing an $NO_x$ absorbing substance and an $NO_x$ reducing catalyst, a catalyst B containing a hydrocarbon adsorption substance and a hydrocarbon oxidizing catalyst, an electron conductive substance C, and an ion conductive substance D, wherein the catalyst A, the catalyst B, the electron conductive substance C, and the ion conductive substance D are mixed together and electrons move between the catalyst A and the catalyst B through the electron conductive substance C and ions move through the ion conductive substance D, so that an $NO_x$ reduction reaction and a hydrocarbon oxidation reaction are simultaneously carried out electrochemically.

2. The electrochemical catalyst for internal combustion engine exhaust purification of claim 1, wherein the electron conductive substance C includes a metal honeycomb coated with a mixture comprising the catalyst A, the catalyst B, and the ion conductive substance D.

3. The electrochemical catalyst for internal combustion engine exhaust purification of claim 1, wherein the electron conductive substance C and the ion conductive substance D are a solid electrolyte comprising a composite of an ion conductor and an electron conductor.

4. A process for purification of exhaust from an internal combustion engine comprising:

mixing together a catalyst A containing an $NO_x$ absorbing substance and an $NO_x$ reducing catalyst, a catalyst B containing a hydrocarbon adsorption substance and a hydrocarbon oxidizing catalyst, an electron conductive substance C, and an ion conductive substance D; and passing exhaust from an internal combustion across the mixture including the catalyst A, the catalyst B, the electron conductive substance C, and the ion conductive substance D so that an $NO_x$ reduction reaction and a hydrocarbon oxidation reaction occur electrochemically and simultaneously, moving electrons between the catalyst A and the catalyst B through the electron conductive substance C and moving ions through the ion conductive substance D, thereby purifying the exhaust.

5. The process for internal combustion engine exhaust purification of claim 4, wherein the electron conductive substance C includes a metal honeycomb coated with a mixture comprising the catalyst A, the catalyst B, and the ion conductive substance D.

6. The internal combustion engine exhaust purification of claim 4, wherein the electron conductive substance C and the ion conductive substance D are a solid electrolyte comprising a composite of an ion conductor and an electron conductor.

* * * * *